United States Patent
Arnaud et al.

(10) Patent No.: US 9,126,158 B2
(45) Date of Patent: Sep. 8, 2015

(54) DEVICES FOR CARRYING OUT MECHANICAL, CHEMICAL AND/OR THERMAL PROCESSES

(75) Inventors: Daniel Arnaud, Hiersingue (FR); Alfred Kunz, Muttenz (CH); Pierre-Alain Fleury, Ramlinsburg (CH)

(73) Assignee: LIST HOLDING AG, Arisdorf (CH)

( * ) Notice: Subject to any disclaimer, the term of this patent is extended or adjusted under 35 U.S.C. 154(b) by 1142 days.

(21) Appl. No.: 13/119,911

(22) PCT Filed: Sep. 21, 2009

(86) PCT No.: PCT/EP2009/006796
§ 371 (c)(1),
(2), (4) Date: May 10, 2011

(87) PCT Pub. No.: WO2010/034446
PCT Pub. Date: Apr. 1, 2010

(65) Prior Publication Data
US 2011/0211420 A1   Sep. 1, 2011

(30) Foreign Application Priority Data

Sep. 23, 2008 (DE) .......................... 10 2008 048 580

(51) Int. Cl.
| | |
|---|---|
| B01F 15/00 | (2006.01) |
| B01F 15/02 | (2006.01) |
| B01F 7/00 | (2006.01) |
| B01F 7/04 | (2006.01) |
| B29B 7/48 | (2006.01) |
| B01F 15/06 | (2006.01) |
| B29B 7/16 | (2006.01) |
| B29B 7/20 | (2006.01) |
| B29B 7/18 | (2006.01) |

(52) U.S. Cl.
CPC ............. *B01F 7/042* (2013.01); *B01F 7/00208* (2013.01); *B01F 7/00466* (2013.01); *B01F 7/00641* (2013.01); *B01F 7/00666* (2013.01); *B01F 15/00714* (2013.01); *B01F 7/043* (2013.01); *B01F 15/00909* (2013.01); *B01F 2015/062* (2013.01); *B01F 2215/005* (2013.01); *B01F 2215/0014* (2013.01); *B01F 2215/0032* (2013.01); *B01F 2215/0036* (2013.01); *B01F 2215/0049* (2013.01); *B01F 2215/0078* (2013.01); *B29B 7/16* (2013.01); *B29B 7/18* (2013.01); *B29B 7/20* (2013.01); *B29B 7/48* (2013.01); *B29B 7/481* (2013.01)

(58) Field of Classification Search
None
See application file for complete search history.

(56) References Cited

U.S. PATENT DOCUMENTS

| | | | |
|---|---|---|---|
| 3,687,422 A | 8/1972 | List | |
| 5,407,266 A * | 4/1995 | Dotsch et al. | 366/97 |

(Continued)

FOREIGN PATENT DOCUMENTS

| | | |
|---|---|---|
| CH | 506322 | 4/1971 |
| CH | 0 517 068 A1 * | 12/1992 |

(Continued)

*Primary Examiner* — Jennifer Wecker
(74) *Attorney, Agent, or Firm* — Bachman & LaPointe, P.C.

(57) ABSTRACT

A device for carrying out mechanical, chemical and/or thermal processes in a housing (3) having mixing and cleaning elements (5) on shafts (1, 2), wherein the mixing and cleaning elements (5) of the shafts (1, 2) engage into each other when rotating about the axes thereof and two mixing and cleaning elements (5) are arranged at least one shaft (1, 2) consecutively in the axial direction in a 180° rotation-symmetrical manner about the axis (A) of the shaft (1, 2). Each mixing and cleaning element (5) comprises a disc element (6) and the disc element (6) has an outer edge (7) running in a radius (r) in an arch segment of approximately 90° or slightly bigger about the axis (A) of the shaft (1, 2) and wherein side edges (8.1, 8.2) abut on both sides toward the shaft (1, 2), wherein one or more bars (9.1, 9.2) sit on the edge (7).

9 Claims, 5 Drawing Sheets

(56) References Cited

U.S. PATENT DOCUMENTS

| | | | |
|---|---|---|---|
| 5,658,075 A * | 8/1997 | Schebesta et al. | 366/97 |
| 6,260,995 B1 * | 7/2001 | Schuchardt | 366/97 |
| 2004/0145964 A1 * | 7/2004 | Kunz et al. | 366/97 |
| 2005/0024987 A1 * | 2/2005 | Kunz et al. | 366/97 |
| 2008/0078853 A1 * | 4/2008 | Sugino et al. | 241/260 |
| 2008/0080300 A1 * | 4/2008 | Stueven et al. | 366/132 |
| 2010/0284237 A1 * | 11/2010 | Takemoto et al. | 366/85 |

FOREIGN PATENT DOCUMENTS

| | | |
|---|---|---|
| DE | 19940521 | 4/2001 |
| DE | 10150900 | 4/2003 |
| EP | 0517068 | 12/1992 |
| EP | 1714694 | 10/2006 |

\* cited by examiner

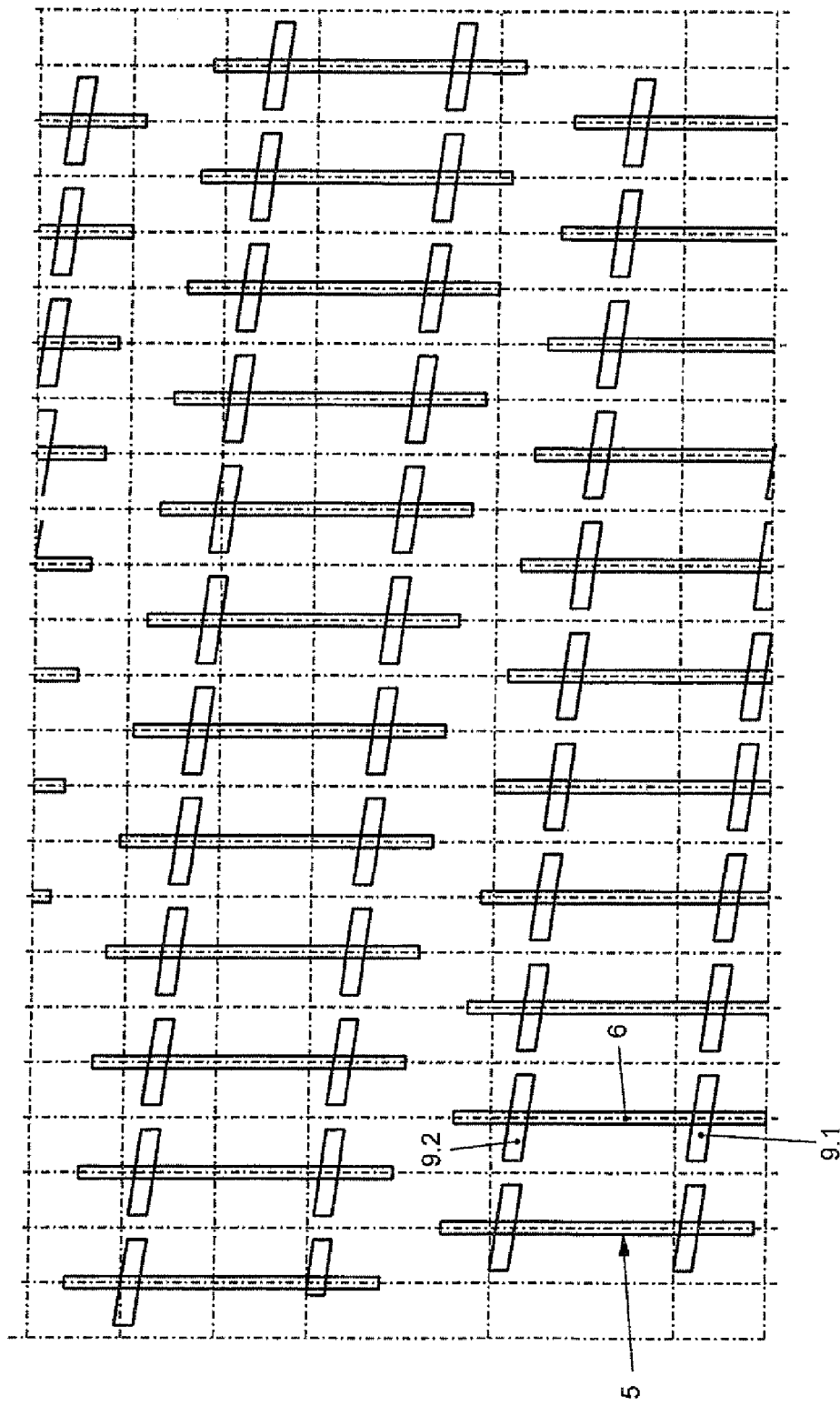

DEVICES FOR CARRYING OUT MECHANICAL, CHEMICAL AND/OR THERMAL PROCESSES

BACKGROUND OF THE INVENTION

The present invention relates to a device for carrying out mechanical, chemical and/or thermal processes in a housing comprising mixing and cleaning elements on shafts, wherein the mixing and cleaning elements of the shafts engage into one another when they rotate about the axes thereof, and two axially successive mixing and cleaning elements are arranged at least on one shaft respectively such that they are rotationally symmetrical by about 180° in relation to one another about the axis of the shaft thereof.

Such devices are also referred to as mixing kneaders. They serve for a wide variety of different purposes. To be mentioned first is evaporation with solvent recovery, which is performed batchwise or continuously and often also under a vacuum. By way of example, this is used for treating distillation residues and, in particular, toluene diisocyanates, but also production residues with toxic or high-boiling solvents from the chemical industry and pharmaceutical production, wash solutions and paint sludges, polymer solutions, elastomer solutions from solvent polymerization, adhesives and sealing compounds.

The apparatuses are also used for carrying out continuous or batchwise contact drying of water-moist and/or solvent-moist products, often likewise under a vacuum. Intended applications are in particular for pigments, dyes, fine chemicals, additives, such as salts, oxides, hydroxides, antioxidants, temperature-sensitive pharmaceutical and vitamin products, active substances, polymers, synthetic rubbers, polymer suspensions, latex, hydrogels, waxes, pesticides and residues from chemical or pharmaceutical production, such as salts, catalysts, slags, waste liquors. These processes also find applications in food production, for example in the production and/or treatment of block milk, sugar substitutes, starch derivatives, alginates, for the treatment of industrial sludges, oil sludges, bio sludges, paper sludges, paint sludges and generally for the treatment of tacky, crust-forming viscous-pasty products, waste products and cellulose derivatives.

In mixing kneaders, degassing and/or devolatilization can take place. This is applied to polymer melts, after the condensation of polyester or polyamide melts, to spinning solutions for synthetic fibers and to polymer or elastomer granules or powders in the solid state.

In a mixing kneader, a polycondensation reaction can take place, usually continuously and usually in the melt, and is used in particular in the treatment of polyamides, polyesters, polyacetates, polyimides, thermoplastics, elastomers, silicones, urea resins, phenolic resins, detergents and fertilizers.

A polymerization reaction can also take place, likewise usually continuously. This is applied to polyacrylates, hydrogels, polyols, thermoplastic polymers, elastomers, syndiotactic polystyrene and polyacrylamides.

Quite generally, solid/liquid and multi-phase reactions can take place in the mixing kneader. This applies in particular to back-reactions, in the treatment of hydrofluoric acid, stearates, cyanates, polyphosphates, cyanuric acids, cellulose derivatives, cellulose esters, cellulose ethers, polyacetal resins, sulfanilic acids, Cu-phthalocyanines, starch derivatives, ammonium polyphosphates, sulfonates, pesticides and fertilizers.

Furthermore, solid/gas reactions can take place (for example carboxylation) or liquid/gas reactions can take place. This is applied in the treatment of acetates, azides, Kolbe-Schmitt reactions, for example BON, Na salicylates, parahydroxybenzoates and pharmaceutical products.

Liquid/liquid reactions take place in the case of neutralization reactions and transesterification reactions.

Dissolution and/or degassing takes place in such mixing kneaders in the case of spinning solutions for synthetic fibers, polyamides, polyesters and celluloses.

What is known as flushing takes place in the treatment or production of pigments.

A solid-state post-condensation takes place in the production or treatment of polyesters and polyamides, a continuous slurrying, for example in the treatment of fibers, for example cellulose fibers, with solvents, crystallization from the melt or from solutions in the treatment of salts, fine chemicals, polyols, alkoxides, compounding, mixing (continuously and/or batchwise) in the case of polymer mixtures, silicone compounds, sealing compounds, fly ash, coagulation (in particular continuously) in the treatment of polymer suspensions.

In a mixing kneader, multi-functional processes can also be combined, for example heating, drying, melting, crystallizing, mixing, degassing, reacting-all of these continuously or batchwise. Substances which are produced or treated by this means are polymers, elastomers, inorganic products, residues, pharmaceutical products, food products, printing inks.

In mixing kneaders, vacuum sublimation/desublimation can also take place, whereby chemical precursors, for example anthraquinone, metal chlorides, organometallic compounds etc., are purified. Furthermore, pharmaceutical intermediates can be produced.

A continuous carrier-gas desublimation takes place, for example, in the case of organic intermediates, for example anthraquinone and fine chemicals.

A mixing kneader of the type mentioned above is known from EP 0 517 068 B1, for example. In it, two shafts extending axially parallel rotate in a counter-rotating or co-rotating manner in a mixer housing. In this case, mixing bars mounted on disk elements act with one another. Apart from the function of mixing, the mixing bars have the task of cleaning as well as possible surfaces of the mixer housing, of the shafts and of the disk elements that are in contact with the product and of thereby avoiding unmixed zones. Particularly in the case of highly compacting, hardening and crust-forming products, the ability of the mixing bars to reach the edges leads to high local mechanical loading of the mixing bars and of the shafts. These force peaks occur in particular when the mixing bars engage in those zones where the product finds it difficult to escape. Such zones are present, for example, where the disk elements are mounted on the shaft.

Furthermore, DE 199 40 521 A1 discloses a mixing kneader of the type mentioned above, in which the carrying elements form a recess in the region of the kneading bars in order that the kneading bar has the greatest possible axial extent. Such a mixing kneader has outstanding self-cleaning of all the surfaces of the housing and of the shafts that come into contact with the product, but has the characteristic that the carrying elements of the kneading bars require recesses on account of the paths of the kneading bars, leading to complicated forms of the carrying elements. One result of this is a complex production process and another result is local stress peaks at the shaft and the carrying elements under mechanical loading. These stress peaks, which occur primarily at the sharp-edged recesses and changes in thickness, in particular in the region where the carrying elements are welded onto the core of the shaft, are causes of cracks in the shaft and the carrying elements as a result of material fatigue.

A distinction is substantially made between single-shaft and dual-shaft mixing kneaders. A multi-shaft mixing and kneading machine is described in CH-A 506 322. In this machine, radial disk elements and axially oriented kneading bars arranged between the disks are located on a shaft. Mixing and kneading elements shaped in a frame-like manner engage between said disks from the other shaft. These mixing and kneading elements clean the disks and kneading bars of the first shaft. The kneading bars on both shafts in turn clean the inner wall of the housing.

These known dual-shaft mixing kneaders have the disadvantage that, owing to the eight-shaped housing cross section, they have a weak point in the region in which the two shaft housings are connected. In this region, high stresses are produced during the processing of tough products and/or during processes which proceed under pressure, and these stresses can only be controlled by complex design measures.

Further problems of the dual-shaft machines are known in respect of
- sealing of the shafts against pressure or seals for an extremely low vacuum,
- explosion protection of the housing,
- accuracy of concentric running in the housing, and
- sealing of the housing.

SUMMARY OF THE INVENTION

It is an object of the present invention to significantly improve a device of the type mentioned above, which is referred to hereinbelow as a mixing kneader, to be precise in terms of the treatment of the product and also in terms of the cleaning of the surfaces that come into contact with the product and the discharge of the product.

The object is achieved firstly in that the mixing and cleaning elements each consist of a disk element, and the disk element has an outer marginal edge, which extends by a radius in an arc segment of about 90° or slightly higher about the axis of the shaft and is adjoined at both ends by side edges extending toward the shaft, wherein one or more bars sits/sit on each marginal edge.

In this configuration, it is no longer possible to distinguish between a cleaning and a stirring shaft, as is still customary in the prior art. The mixing and cleaning elements on both shafts have both mixing and cleaning tasks. They carry out intensive and very extensive cleaning of all the surfaces and elements that come into contact with the product. This applies to the inner wall of the housing, to mixing and cleaning elements themselves and also to the shell of the shafts.

The mixing and cleaning elements should preferably be formed identically on both shafts. This not only simplifies production and maintenance, but also leads to uniform loading of the individual operating elements, for example of bars as parts of the mixing and cleaning elements.

An essential feature of the present invention also relates to the configuration of the mixing and cleaning elements. These are each composed of a disk element and at least one bar which is attached to said disk element and extends in the axial direction. However, in this case the disk elements are preferably configured such that they delimit only part of the kneading chamber and, since they are arranged offset rotationally symmetrically by 180° in relation to one another on the axis, also only ever delimit the kneading chamber on one side. This has the effect that the product stream is guided radially back and forth as it is conveyed from an entry to a discharge, as in a labyrinth. This provides optimum radial mixing, which was not known to date in this form.

Furthermore, the arrangement of the disk elements of the mixing and cleaning elements also provides a continuous gas chamber, which leads to a significantly improved discharge of evaporated solvent or the like.

In a particularly preferred exemplary embodiment, the disk elements have an outer marginal edge which extends by a radius about the axis of the shaft. In this respect, the disk element covers an arc segment of about 90° or slightly higher.

Furthermore, a bar is preferably attached to the marginal edge of the disk element at both ends. Cleaning can be improved even by providing a middle bar between the two bars.

If the mixing and cleaning elements are arranged in such a manner, it is preferably also provided that both shafts rotate in a co-rotating manner in the ratio 1:1. This co-rotation does not result in what is known as the roll-mill effect, which leads to blockage of the product, primarily when a high-viscosity product is involved.

Furthermore, it has become apparent in practice that the same geometries of both shafts and of the mixing and cleaning elements thereon result in a significantly more uniform flow of the product stream. Furthermore, the arrangement selected provides a high self-cleaning effect, which in turn also leads to a better (closer) residence time distribution and, at the same time, to an intensive mixing and kneading action.

In addition, the mixing and cleaning elements selected also make very good backmixing possible, if the conveying elements, in particular the bars, are operated appropriately. Accordingly, the arrangement selected is also ideal for batch machines.

A further concept, for which separate protection is also sought, is that the cross section of the shaft is no longer round but instead has a polygonal form, in particular has a square or hexagonal form. However, the square is moderated by virtue of the fact that the lateral surface between the corner regions has an arched form. To that end, better cleaning is again achieved in conjunction with the bars on the disk elements. This polygonal configuration of the shafts is suitable primarily in the case of very expensive and strongly crust-forming or very high-viscosity products. Furthermore, it is also possible to choose any development angle with polygonal shafts.

A further element of the present invention, for which separate protection is likewise also sought, is the configuration of the discharge. Here, a discharge opening should be assigned a corresponding discharge element which rotates together with the shaft. By way of example, this discharge element may be a discharge star provided with teeth and cutting edges, so that product is continuously cut off by the cutting teeth and pressed through the discharge opening. In addition, the operation of the discharge star can also be assisted by a deflector.

This special dynamic discharge star, combined with the statically adjustable deflector, ensures regular product discharge. Furthermore, the discharge frequency per shaft rotation can be selected by virtue of the number of cutting teeth, independently of the shaft geometry. This makes it possible to optimize the discharge elements, such as twin or mono screws. This selected discharge device also makes more targeted level control possible in continuous and backmix processes. The discharge device is suitable specifically for high-viscosity products, so-called shaft winders.

Instead of the discharge star, it is also possible to provide laminated stacks, in which case a number of elliptically shaped laminations sit on the shafts. They can also each be rotated slightly about the shaft so as to produce a fan-shaped laminated stack.

Furthermore, not only is one discharge opening provided underneath a shaft, but rather preferably also one or two discharge openings are provided between the two shafts. In this case, it is preferable for discharge elements to be attached to both shafts, such that more product can be discharged through the discharge openings on rotation of the shafts.

Within the context of the invention, it is provided that the discharge opening can be located in the end wall of the housing. It is also equally possible, however, for the discharge opening to be arranged in the cylindrical housing wall. Here, it is also possible to configure the discharge opening such that it is axially and/or radially adjustable during operation both in one arrangement and in the other.

In order to set a desired product level, it may prove to be expedient for the discharge opening to be assigned a blocking plate.

In addition, it is possible for the discharge opening to be assigned a single-shaft or multi-shaft discharge screw. This can be arranged such as to lie at the bottom or else transversely to the main shafts, although this arrangement is only one possibility. This discharge screw can also serve for emptying residual material from the housing. Furthermore, the blocking plate in the lower region can be openable in order to empty residual material from the housing. A further simple possibility is that one or more closable openings for emptying residual material are arranged in the housing wall. The residual material is preferably emptied into the same shaft through which the product discharge also takes place.

A further concept of the invention relates to the assignment of weighing cells to the device or to the housing, with which weighing cells the content/hold-up of the housing is determined. In a preferred exemplary embodiment of the invention, this content/hold-up can be controlled via the rotational speed of the discharge screw, i.e. if the content of the housing is to be increased, the rotational speed of the discharge screw is decelerated (or accelerated in the reverse case).

On the other hand, it is also possible, of course, to keep a filling level of the device constant by controlling the rotational speed of the discharge screw via the signal of the weighing cells. If the filling level threatens to drop, the rotational speed is decelerated. If the filling level threatens to rise, the rotational speed is increased and the discharge is therefore accelerated.

In addition, it is conceivable for solids to be fed into the housing via single-shaft or multi-shaft feed screws. These feed screws preferably issue flush into the housing wall; by way of example, this can also take place laterally or through an end plate.

Possible exhaust vapors still present during the discharge should pass through the opening in the housing wall together with the product. These are then removed in an adjoining downpipe in a manner opposing the product.

Overall, the present invention relates to a mixing kneader in which the outstanding self-cleaning means that no clumps are formed. As a result, it is also possible to operate the mixing kneader in an only partially filled state, such that the solid metered in has enough space. As a result, no locally inadmissible loads are produced in the mixing kneader.

BRIEF DESCRIPTION OF THE DRAWINGS

Further advantages, features and details of the invention will become apparent from the following description of preferred exemplary embodiments and also on the basis of the drawing, in which:

FIG. 7 is a schematic illustration of part of a developed view of a mixing kneader according to FIGS. 1 and 2.

DETAILED DESCRIPTION

Figures 1, 2:
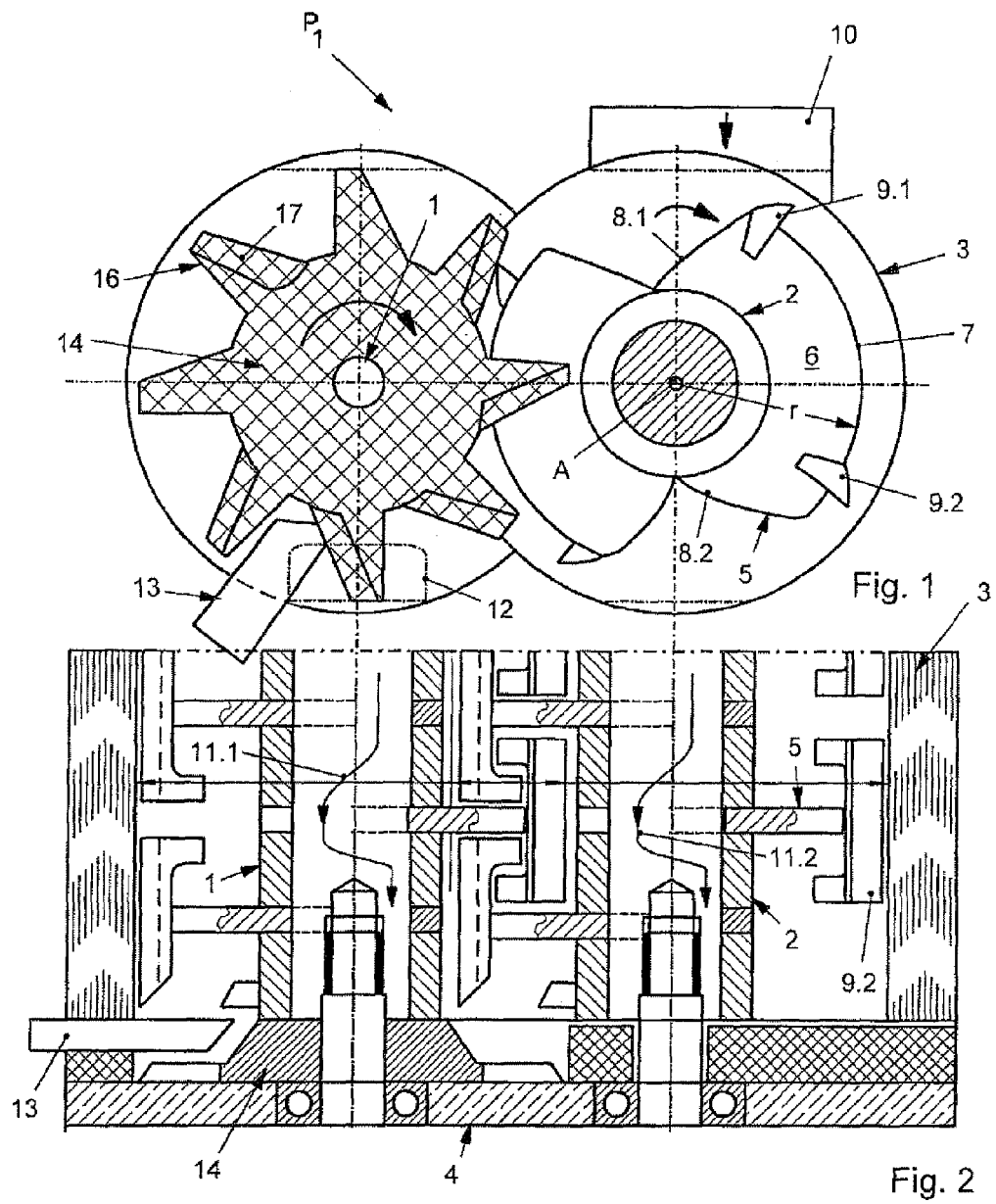
FIG. 1 is a view from the front of a device according to the invention for carrying out mechanical, chemical and/or thermal processes (mixing kneader) with a removed end disk.
FIG. 2 is a partially illustrated longitudinal section through a mixing kneader similar to FIG. 1.

According to FIGS. 1 and 2, there are two shafts 1 and 2 in a housing 3 of a mixing kneader P1, it being possible for both the shafts 1 and 2 and also the housing 3 to be filled with a temperature-controlled medium. For this purpose, the housing 3 is therefore formed as a twin-shell housing. On the front side, the housing 3 is closed off by an end plate 4.

Mixing and cleaning elements 5 of a substantially identical form sit on the shafts 1 and 2. They consist of a disk element 6, having a marginal edge 7 which extends approximately in a radius r about an axis A of the shaft 1 or 2 and in an arc segment of about 90°. Side edges 8.1 and 8.2 then extend from the marginal edge 7 in an arcuate manner toward the shaft 1 or 2. Such disk elements are arranged in succession on the shaft 1 or 2 such that they are rotationally symmetrical by 180°.

Furthermore, it can be seen that the marginal edge 7 is occupied by two bars 9.1 and 9.2, which extend approximately parallel to the axis A but, in the developed view shown in FIG. 7, are formed obliquely. It is thereby possible to influence the conveying activity of the product to be processed.

The mode of operation of the present invention is as follows:

A product to be treated passes via an entry 10 into the interior of the housing 3, where it is detected by the rotating mixing and cleaning elements 5 on the shafts 1 and 2. In the process, the product is intensively kneaded and sheared by the mixing and cleaning elements 5, such that it can be intensively mixed with other products, additives, solvents, catalysts, initiators, etc. In contrast to known mixing kneaders, in the present invention it is no longer possible to distinguish between a stirring shaft with stirring elements and a cleaning shaft with cleaning elements. According to the present invention, the shafts 1 and 2 with the mixing and cleaning elements thereof take on to an equal extent the mixing of the product and the cleaning of the other shaft or of the inner wall of the housing or of the mixing and cleaning elements on the other shaft.

The described arrangement of the disk elements and the configuration thereof implement optimum radial mixing and, in particular, make a so-called labyrinth effect possible, as is shown by the arrows 11.1 and 11.2 for the product. Here, it is assumed that both shafts rotate in a co-rotating manner in a ratio of 1:1, in the present case in the clockwise direction.

As soon as the product passes in the direction of the end plate 4, i.e. to a discharge 12 (indicated by dashed lines), according to the invention it should be deflected toward said discharge 12. This is done using a deflector 13 in cooperation with a discharge star 14. Whereas the deflector 13 is fixed statically in the housing, the discharge star 14 rotates together with the shaft 1, the discharge star being provided with a plurality of cutting teeth that press the product to be discharged into the discharge opening 12. The cutting teeth have cutting edges 17 in the direction of rotation. As a result, a portion is always cut off from the product stream and pressed through the discharge opening 12.

Figure 3:
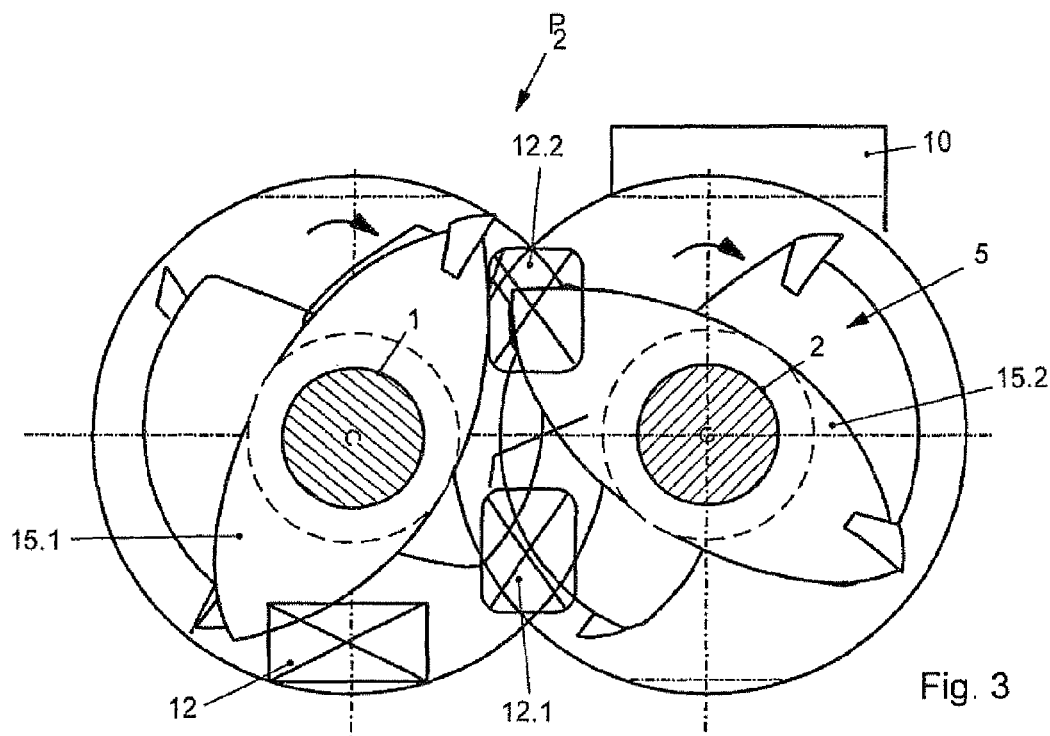
FIG. 3 is a schematically illustrated view from the front of a further exemplary embodiment of a mixing kneader with a removed end disk.
Figure 4:
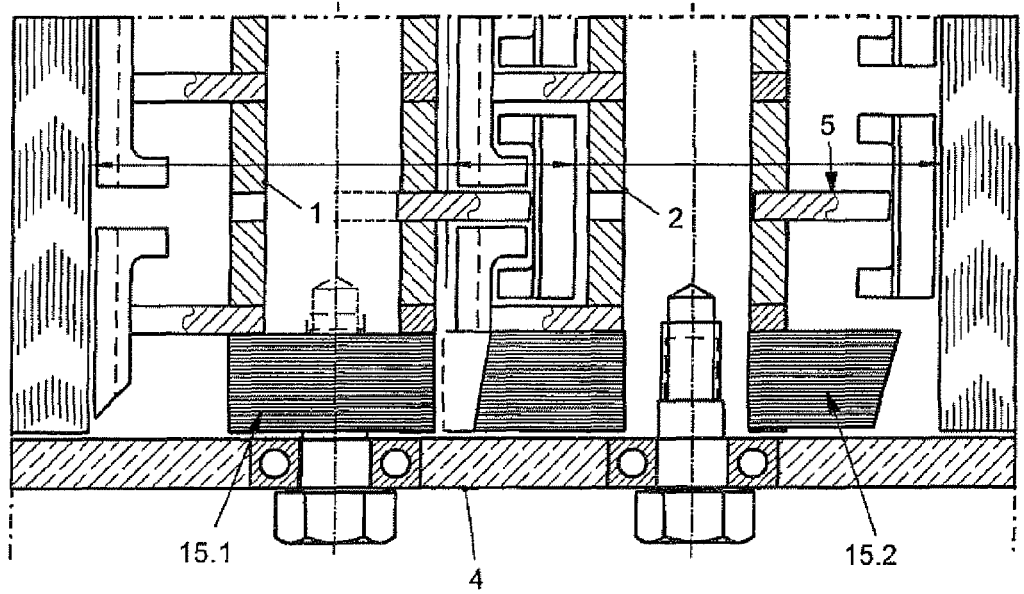
FIG. 4 is a partially illustrated longitudinal section of the mixing kneader similar to FIG. 3.

FIGS. 3 and 4 show another possibility for the discharge. In this case, in addition to the discharge opening 12, two further discharge openings 12.1 and 12.2 are also provided between the two shafts 1 and 2, and the product can likewise be discharged through said openings. Instead of the discharge star, however, laminated stacks 15.1 and 15.2, having an elliptical configuration in the plan view shown in FIG. 3, are attached to the shafts 1 and 2. This arrangement ensures that the product is discharged in portions. The discharge 12 is served only by the laminated stack 15, which means only two pulses per rotation. On the contrary, the discharge openings 12.1 and 12.2 are brushed over both by the laminated stack 15.1 and the laminated stack 15.2, and therefore in each case four pulses per rotation are possible here. This arrangement makes it possible to also control the discharge of the product and, in particular, the discharged quantity.

Figure 5:
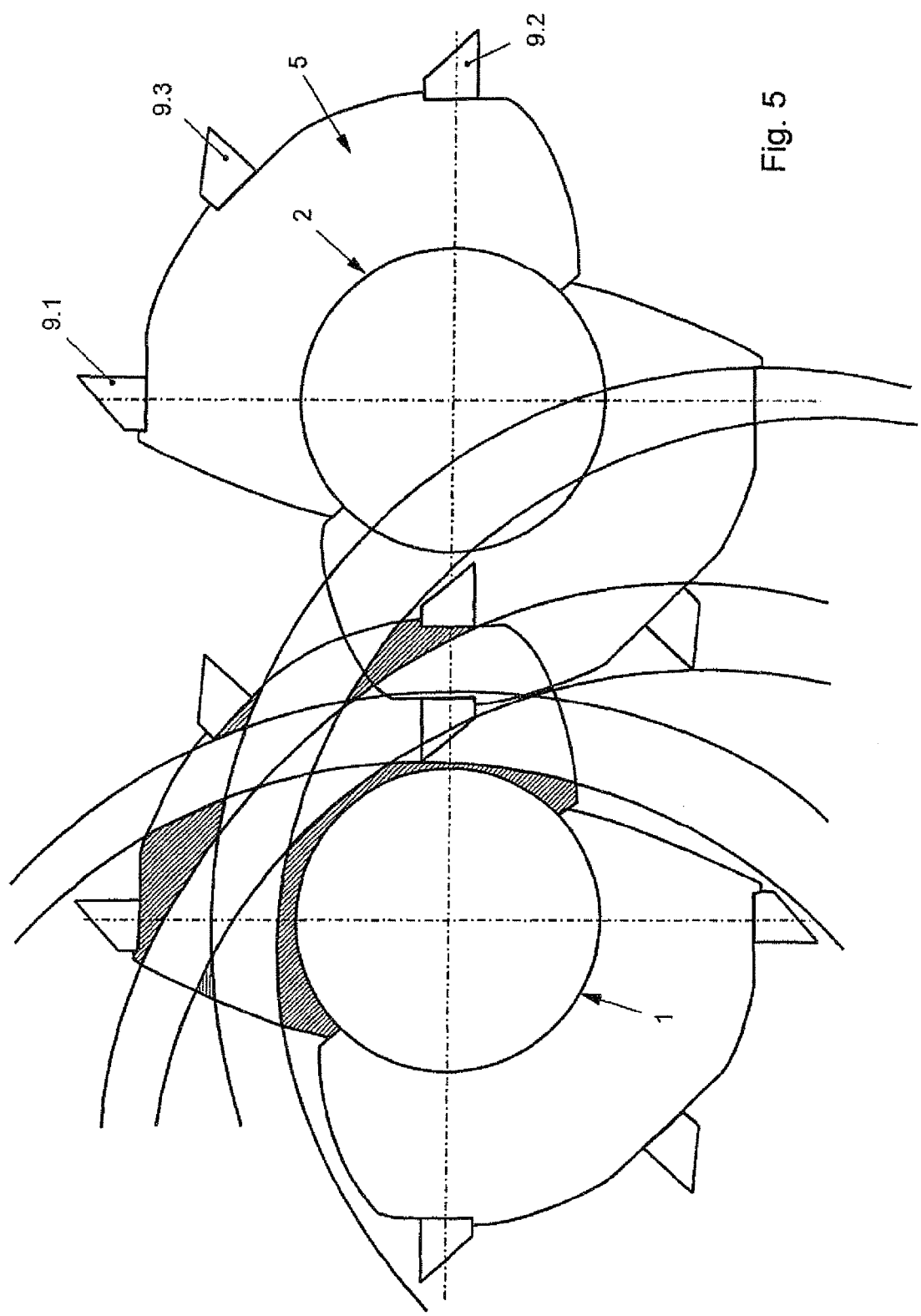
FIG. 5 is a schematic view from the front of two further exemplary embodiments of shafts interacting in a mixing kneader.

According to FIG. 5, a third bar 9.3 should also be provided between the two bars 9.1 and 9.2. As a result, the cleaning of the opposing disk elements and, in particular, of the opposing shaft is again improved, as indicated by dashed zones.

Figure 6:
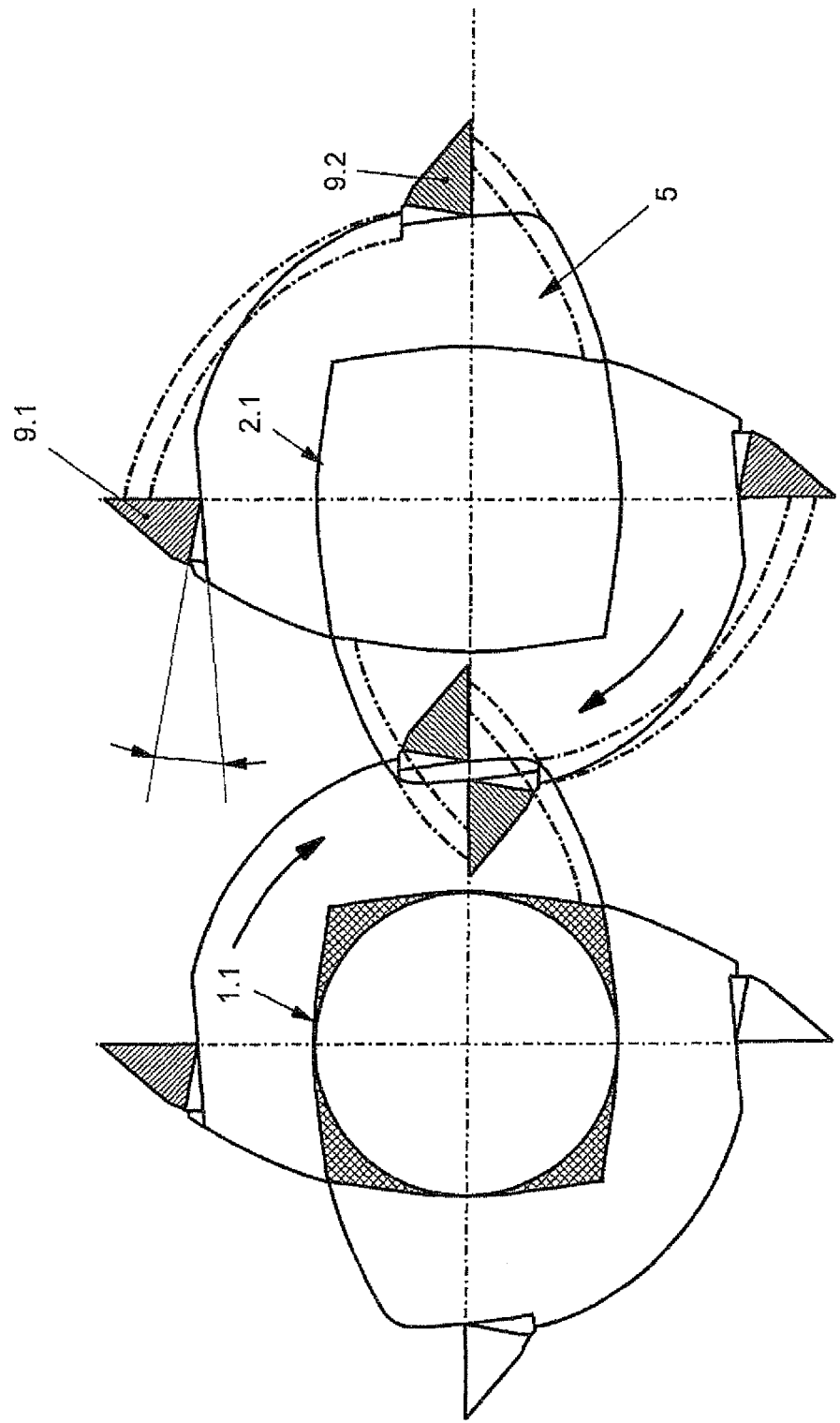
FIG. 6 shows a further exemplary embodiment of two shafts interacting in a mixing kneader.

It can be seen in FIG. 6 that the cross section of the shaft 1.1 or 2.1 can also have a polygonal form. It goes without saying that this applies primarily to the lateral surface of the shaft 1.1 or 2.1, the cleaning of which in cooperation with the bars 9.1 and 9.2 is again improved, as indicated by the cross hatching compared to a round shaft.

The invention claimed is:

1. A device for carrying out mechanical, chemical and/or thermal processes in a housing (3) comprising mixing and cleaning elements (5) on shafts (1, 2) having axes (A), wherein the mixing and cleaning elements (5) of the shafts (1, 2) engage into one another when they rotate about the axes thereof, and two axially successive mixing and cleaning elements (5) are arranged at least on one shaft (1, 2) respectively such that they are rotationally symmetrical by about 180° in relation to one another about the axis (A) of the at least one shaft (1, 2) thereon, the mixing and cleaning elements (5) each consist of a disk element (6), and the disk element (6) has an outer marginal edge (7), which the outer marginal edge of the disk element extends by a radius (r) in an arc segment of about 90° or slightly higher about the axis (A) of the shaft (1, 2) and is adjoined at both ends by side edges (8.1, 8.2) extending in an arcuate manner toward the shaft (1, 2), wherein two or more bars (9.1, 9.2) sit on each marginal edge (7) and extend approximately parallel to axis A.

2. The device as claimed in claim 1, wherein the mixing and cleaning elements (5) are formed identically on both shafts (1, 2).

3. The device as claimed in claim 1, wherein there are three bars including a middle bar (9.3) between the two bars (9.1, 9.2).

4. The device as claimed in claim 1, wherein a blocking plate in a lower region of the housing can be opened in order to empty residual material from the housing (3).

5. The device as claimed in claim 1, wherein one or more closable openings for emptying residual material are present in the housing.

6. The device as claimed in claim 5, wherein the closable opening in the housing for emptying residual material issues into the same shaft as the product discharge.

7. The device as claimed in claim 1, wherein solids are fed into the housing (3) via single-shaft or multi-shaft feed screws, which, if appropriate, issue flush into a wall of the housing.

8. The device as claimed in claim 1, wherein self-cleaning of the device means that no clumps are formed, and thereby the device can be operated in an only partially filled state, such that the solid metered in has enough space, without producing local, inadmissible loads in the device.

9. The device as claimed in claim 1, wherein exhaust vapors in the device pass through an opening in the housing together with the product, and are removed in an adjoining downpipe in a manner opposing the product.

\* \* \* \* \*